Figure 1:
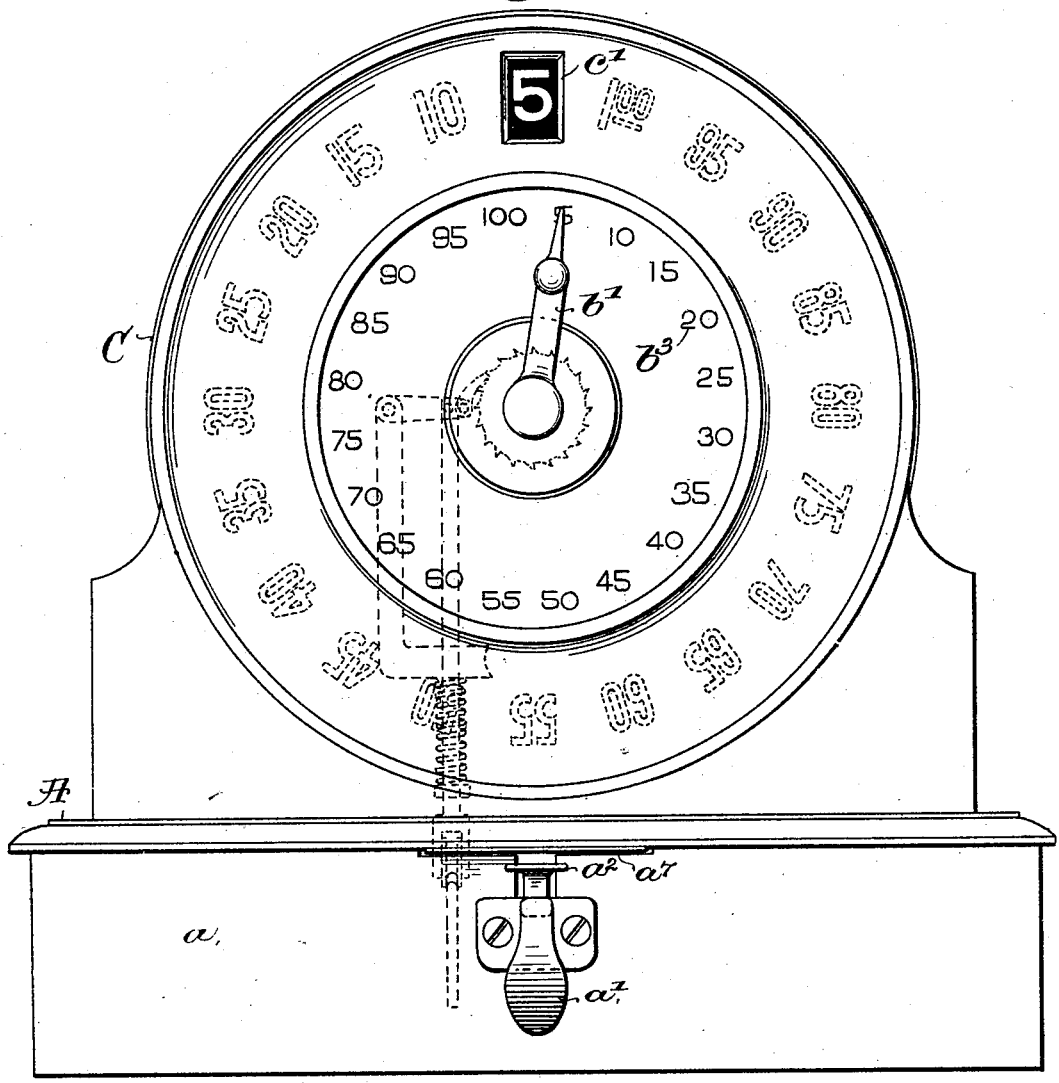

(No Model.) 8 Sheets—Sheet 1.

J. F. GOODRIDGE.
CASH REGISTER, INDICATOR, AND RECORDER.

No. 557,577. Patented Apr. 7, 1896.

WITNESSES:
Thos. H. Seely.
A. C. Harmon

INVENTOR:
James F. Goodridge,
by Crosby Gregory, attys.

(No Model.) 8 Sheets—Sheet 2.
J. F. GOODRIDGE.
CASH REGISTER, INDICATOR, AND RECORDER.
No. 557,577. Patented Apr. 7, 1896.
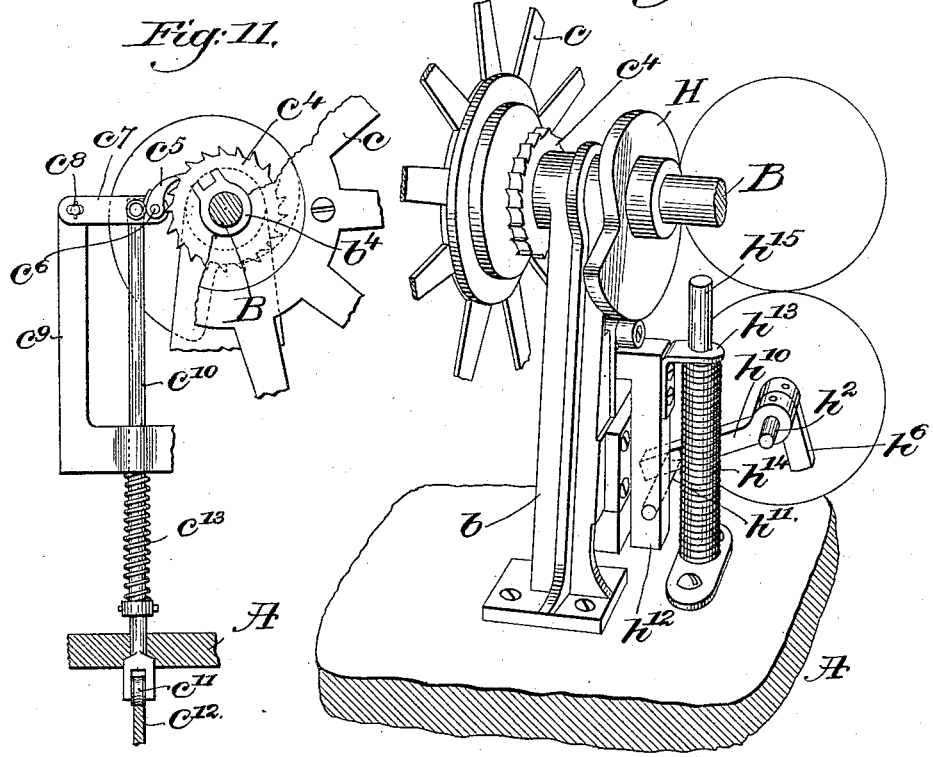
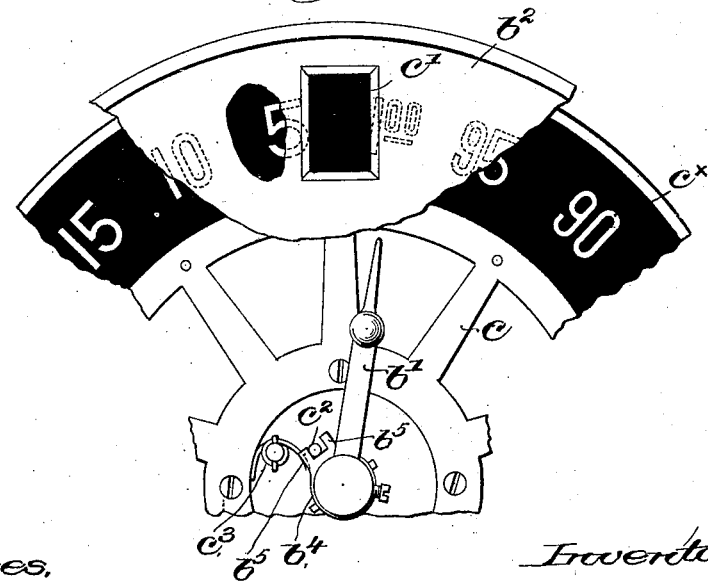
Witnesses,
A. C. Harmon
Thomas J. Drummond
Inventor:
James F. Goodridge,
by Crosby & Gregory, Attys (No Model.) 8 Sheets—Sheet 4.
J. F. GOODRIDGE.
CASH REGISTER, INDICATOR, AND RECORDER.
No. 557,577. Patented Apr. 7, 1896.

WITNESSES: Thos. H. Suly. A.C. Harmon

INVENTOR: James F. Goodridge, by Crosby Gregory. attys.

(No Model.) 8 Sheets—Sheet 5.

J. F. GOODRIDGE.
CASH REGISTER, INDICATOR, AND RECORDER.

No. 557,577. Patented Apr. 7, 1896.

WITNESSES: Thos. H. Seely. A. C. Harmon.

INVENTOR: James F. Goodridge by Crosby & Gregory attys (No Model.) 8 Sheets—Sheet 6.
J. F. GOODRIDGE.
CASH REGISTER, INDICATOR, AND RECORDER.
No. 557,577. Patented Apr. 7, 1896.

WITNESSES: Thos. H. Seely, A. C. Harmon

INVENTOR: James F. Goodridge, by Crosby & Gregory, attys (No Model.) 8 Sheets—Sheet 8.

J. F. GOODRIDGE.
CASH REGISTER, INDICATOR, AND RECORDER.

No. 557,577. Patented Apr. 7, 1896.

WITNESSES:
Thos. H. Seely
A. C. Harmon

INVENTOR:
James F. Goodridge
by Crosby Gregory
attys

UNITED STATES PATENT OFFICE.

JAMES F. GOODRIDGE, OF BOSTON, MASSACHUSETTS, ASSIGNOR TO CHARLES J. ROLFE, OF CAMBRIDGE, MASSACHUSETTS.

CASH REGISTER, INDICATOR, AND RECORDER.

SPECIFICATION forming part of Letters Patent No. 557,577, dated April 7, 1896.

Application filed July 23, 1894. Serial No. 518,292. (No model.)

*To all whom it may concern:*

Be it known that I, JAMES F. GOODRIDGE, of Boston, county of Suffolk, State of Massachusetts, have invented an Improvement in Cash Indicators and Registers, of which the following description, in connection with the accompanying drawings, is a specification, like letters on the drawings representing like parts.

This invention has for its object to provide an improved and simplified cash indicator and register.

In its preferred form my invention comprehends a machine which not only displays the amount of sale to the purchaser, but also adds or sums up the total amount of sales, and prints or records, in suitable manner, upon a paper strip or otherwise, the amount of the sale, though I desire it to be understood that machines embodying my invention may be used employing with the devices for indicating the amount of sale to the purchaser devices for adding or summing up the total sales without the printing or recording mechanism, and vice versa, with the printing or recording and without the adding mechanism.

One of the principal features of my invention relates to the devices for indicating to the purchaser the amount of the sale.

Cash indicators and registers as usually constructed may, so far as their operation is concerned, be classed under three heads—viz., those in which the amounts of purchase are set or indicated by the depression of various key-levers, those in which the said amounts are fixed and indicated by rotation of a pointer upon a dial upon which are displayed the several amounts of purchase, and those in which the amounts of purchase are fixed and indicated by the rotation of one or more disks by means of handles thereon and upon which the various characters representing the amounts of purchase are displayed. In all machines of either of these classes, so far as known to me, it is necessary to first fix and display the amount of purchase before the money or change drawer can be opened, and in all of them, as I believe, the amount of purchase is necessarily displayed before the drawer is moved. In my experiments to perfect apparatus of this kind I have found it to be desirable to conceal the amount of purchase from the purchaser until the salesman has been forced to open the drawer, make the proper change, and again close the drawer, I having found this to be a needed safeguard.

One of the principal features of my invention therefore consists in providing the apparatus with suitable mechanism for visually indicating to the purchaser the amount of the sale or purchase, which mechanism is so constructed that it is first fixed or selected before the drawer can be opened, but remains concealed from view until the drawer is moved, movement of the drawer causing the exposure of the fixed or selected character or characters. In connection with this I preferably employ suitable devices to compel the drawer, when once started, to be fully opened and again fully closed.

In the preferred embodiment of my invention the several characters representing various amounts of purchase are arranged upon a rotating wheel, which wheel is suitably mounted upon a shaft adapted to be rotated by a pointer sweeping over a suitable dial upon which are correspondingly arranged other characters indicating the amounts of purchase.

All the characters of the wheel, except the one showing the amount of last purchase, are in this construction normally concealed from view, rotation of the pointer at each sale bringing the character representing the amount of such sale into position adjacent the view-opening, though still concealed from view therethrough, subsequent movement of the drawer acting to expose the character thus fixed or selected at the said opening.

In the preferred embodiment of my invention a type-wheel, upon which type-characters are arranged to correspond with the arrangement of visual characters on the indicating-wheel referred to, is mounted upon the pointer-shaft and rotated thereby, and suitable printing mechanism actuated by movement of the drawer coöperates therewith to permanently record or print upon a continuous or other strip the successive amounts of purchase.

My invention further comprehends a suitable adding device, movement of which is fixed or determined by the selecting mechanism and afterward operated by movement of the drawer.

These, together with other features of my invention, including various details of construction, will be more fully hereinafter described, and set forth in the claims at the end of the specification.

Figure 2:
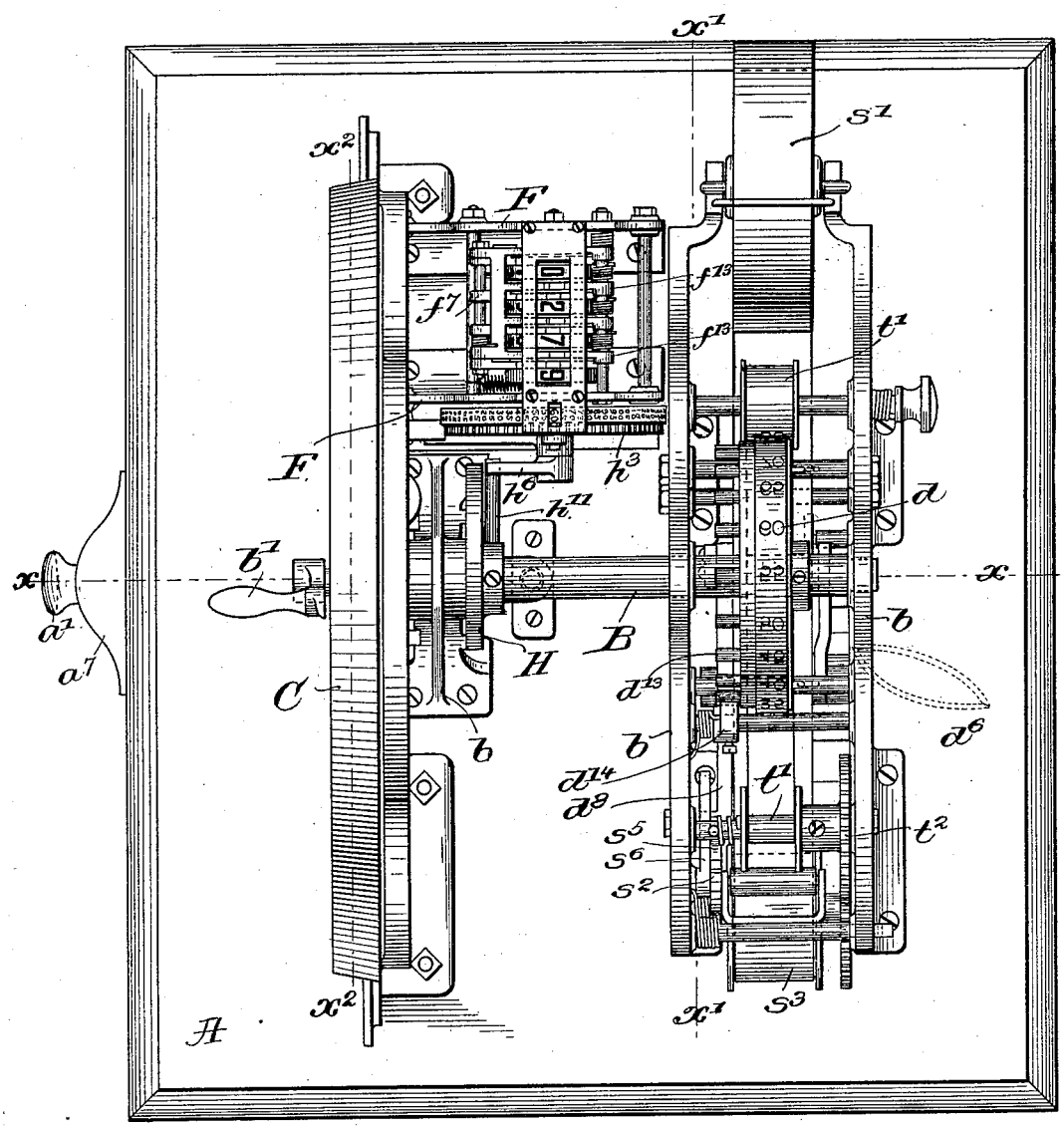
Figure 3:
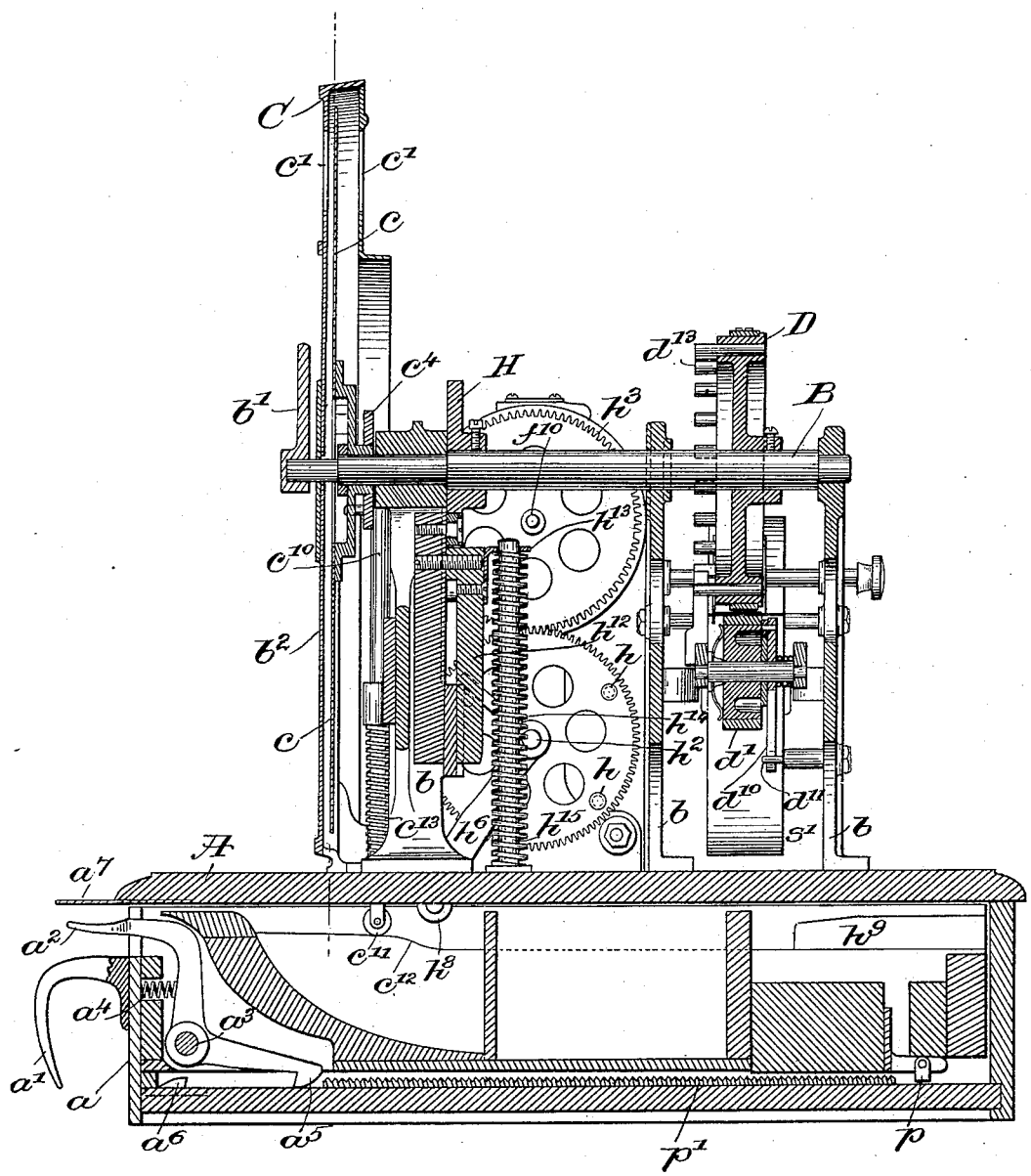
Figure 4:
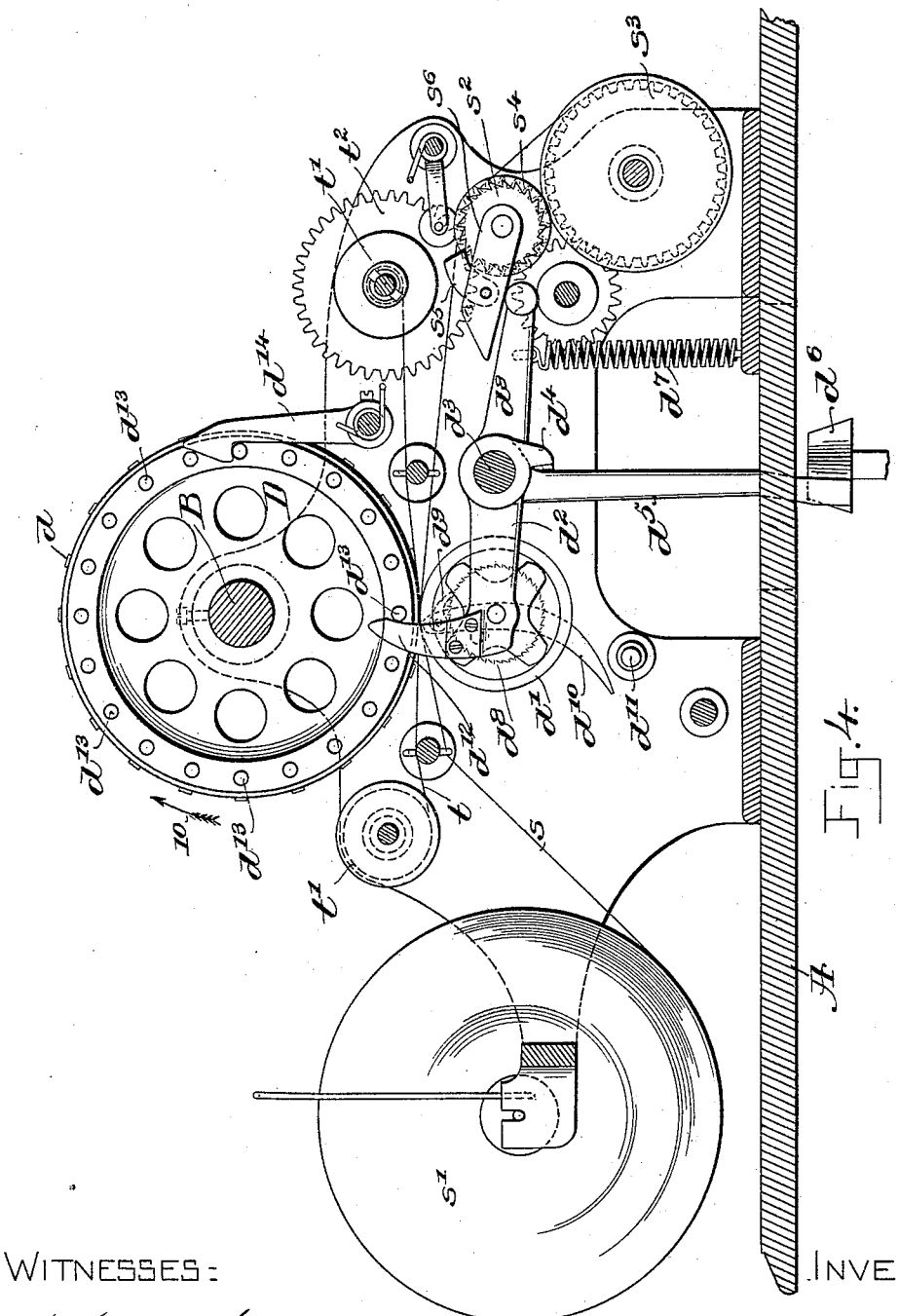
Figure 5:
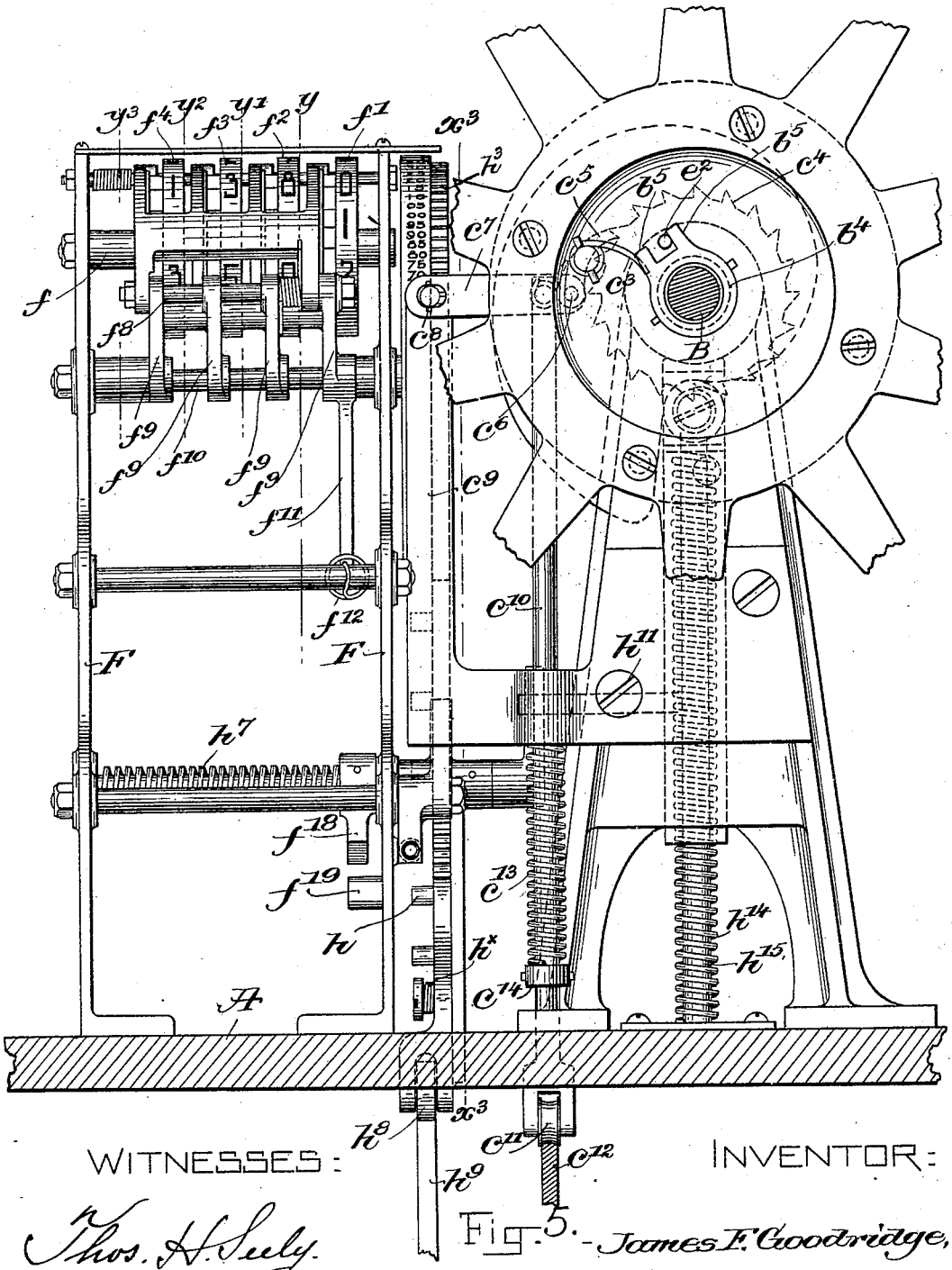
Figure 6:
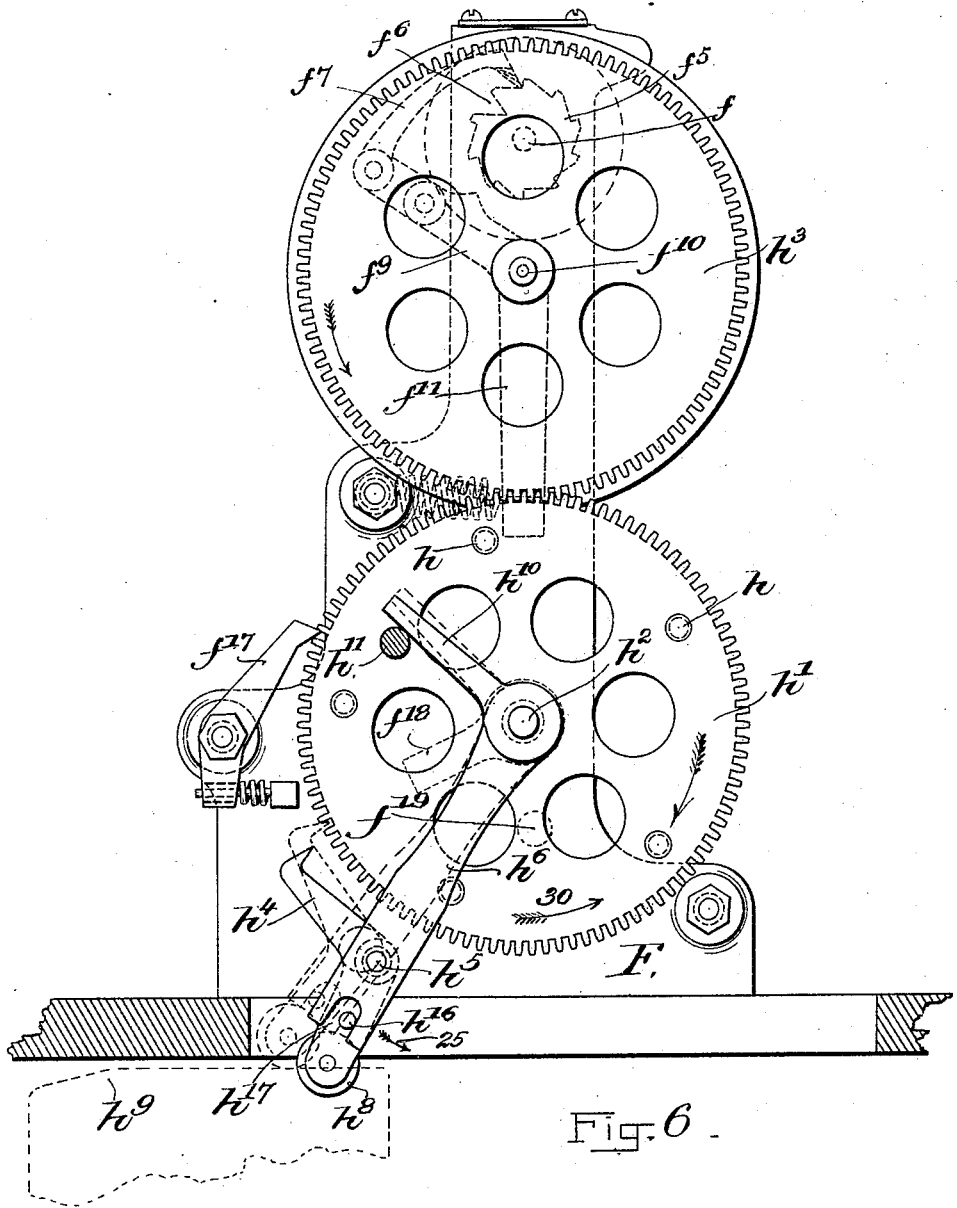

In the drawings, Figure 1 represents in face view one and the preferred form of machine embodying my invention; Fig. 1$^a$, a detail of the same, showing the selected character "5" moved into position adjacent, but concealed from view at the view-opening; Fig. 2, a top or plan view of the machine shown in Fig. 1 with the inclosing case removed; Fig. 3, a vertical section taken on the dotted line $x\,x$, Fig. 2; Fig. 3$^a$, a perspective detail showing the cam H and its connections for actuating the adding mechanism, but in a different position from that of the other figures; Fig. 4, a vertical section taken on the dotted line $x'\,x'$, Fig. 2, looking toward the rear of the machine; Fig. 5, a vertical section on the dotted line $x^2\,x^2$, Fig. 2, with the front of the inclosing case, including the fixed dial, removed; Fig. 6, a vertical section taken on the dotted line $x^3\,x^3$, Fig. 5, showing the adding mechanism in elevation; and Figs. 7 to 10, inclusive, sectional details taken, respectively, on the dotted lines $y$, $y'$, $y^2$, and $y^3$, Fig. 5, showing the construction and illustrating the operation of the adding mechanism; Fig. 11, a detail showing mechanism for exposing the selected visual characters.

Referring to the drawings, in the particular machine there shown as embodying and illustrating my invention A is a suitable case containing a usual money-drawer $a$, adapted to slide in and out of the same, said drawer being provided with a suitable handle $a'$. (Shown best in Fig. 3.) Inasmuch as the parts are locked when the drawer is closed, and the said locking mechanism is operated by movement of the drawer, as will be described, it is necessary to first partially open the drawer to release the locking mechanism before the visual indicating-characters, printing and adding mechanism, either or all, may be set or selected, and it is further desirable to compel the salesman to make the proper selection of characters before he has completely opened the drawer. To accomplish this I have provided a lock to stop the drawer when it has been partially opened, to indicate to the salesman that he must then stop and select or display the visual character indicating the amounts of purchase, after which he releases the lock and completes the opening and closing of the drawer, the locking mechanism previously referred to requiring full opening of the drawer when once started before it can be closed.

The locking device herein shown to stop the drawer after partial opening of the same consists of an L-shaped lever $a^2$ pivoted at $a^3$ on the drawer and acted upon by the spring $a^4$, one end of the said lever in the present instance being hooked, as at $a^5$, to engage a stop $a^6$ on the bottom of the drawer-case. The finger end of the said locking-lever, when the drawer is closed, is concealed by a suitable plate $a^7$ on the case, as shown.

The drawer may be opened without releasing the locking device until in its movement the hooked end $a^5$ of the locking-lever engages the stop $a^6$, after which, the proper visual character having been selected, the said lever is moved to disengage it from said stop to permit farther opening of the drawer.

Mounted upon the inclosing case A are the front and back frame-plates $b\,b$, there being two of the latter, in which plates is journaled the main or pointer shaft B, provided at its front end with a suitable pointer $b'$ adapted to sweep over a fixed dial $b^2$ on the face-plate of the inclosing case, the said dial having circularly arranged thereon, as best shown in Fig. 1, characters $b^3$ representing the amounts of the several purchases.

Loosely mounted on the pointer-shaft B and connected therewith by devices to be described is an indicator-wheel $c$, (see Figs. 1$^a$ and 5,) at the periphery and upon the face of which are displayed, as shown in dotted lines, Fig. 1, and full lines, Fig. 1$^a$, visual characters $c^x$, also representing amounts of the several purchases, but arranged in reverse order to the arrangement of the corresponding characters on the fixed dial $b^2$. The indicator-wheel $c$ has also at its rear side a second series of characters of the same denomination as those at the face of the wheel, but necessarily arranged in opposite or reverse order, the arrangement of the characters at the back of the wheel corresponding in every respect to the arrangement of the characters on the face of the dial $b^2$.

The indicator-wheel $c$ is herein concealed or inclosed in a suitable inclosing case or shell C, (see Figs. 1 to 3,) which inclosing case is provided at its opposite sides, and preferably at its highest point, with visual or sight openings $c'$, (see Fig. 3,) shown directly opposite each other, only one of which is shown in Fig. 1, and through which one of the characters of each series of the indicating-wheel may be exposed at the proper time.

Referring now to Figs. 1$^a$, 3, and 5, the pointer-shaft B has fast upon it a hub $b^4$ provided with two projecting ears $b^5$, holding between them a pin $c^2$ on the hub of the indicating-wheel $c$, the distance between the two ears $b^5$ being considerably greater than the diameter of the pin $c^2$, to provide a lost motion equivalent to the space occupied by any character upon the indicating-wheel. A spring $c^3$ on the hub of the indicating-wheel bears against one of the ears $b^5$ and tends to keep the pin $c^2$ normally against the left-hand ear $b^5$, Figs. 1$^a$ and 5, said pin, however, being at times positively moved against the other of the said ears by rotation of the indicating-wheel on and with relation to the shaft B by mechanism and for a purpose to be described.

Upon the hub of the indicating-wheel I have fixed a ratchet-wheel $c^4$, (see Fig. 11,) with which coöperates a pawl $c^5$ pivoted at $c^6$ on the end of a lever $c^7$, in turn pivoted at $c^8$ to an arm $c^9$ of the front plate, the said lever $c^7$ having jointed to it the upper end of a vertical slide-rod $c^{10}$, mounted in suitable bearings in the front frame-plate and provided at its lower end with a roller $c^{11}$ adapted to travel on the top of the track $c^{12}$ on the money or change drawer, said slide-rod being normally depressed to keep its roller $c^{11}$ in operative contact with the said track by a spring $c^{13}$ encircling the said rod and acting at one end against the arm $c^9$ and at its opposite end upon a collar $c^{14}$ fast upon said slide-rod.

By reference to Fig. 3 it will be noticed that the track $c^{12}$, near the front of the drawer, has a slight rise, so that when the drawer is withdrawn the roller $c^{11}$ trails down the incline of the track, upon the level portion thereof, and thereby drops the vertical slide-rod $c^{10}$ and its pawl $c^5$ to permit the spring $c^3$ to turn the indicating-wheel to the left, Fig. 5, following the retreating pawl $c^5$ until its pin $c^2$ contacts with the other or left ear $b^5$ on the pointer-shaft, as in Fig. 1$^a$, so that when the drawer is open, however little, the pin $c^2$ is always in contact with the left ear $b^5$, as there shown. If, now, the pointer $b'$ be turned to any particular character on the fixed dial, to thereby rotate the pointer-shaft to bring the indicating-wheel into position to subsequently expose the corresponding character thereon, it will be found that the indicating-wheel will be rotated not quite sufficient to expose the desired character, leaving the same adjacent the view-opening $c'$ in the inclosing case, but concealed by the side wall of the said case, as shown in Fig. 1$^a$. When, however, the money-drawer is subsequently closed, the roller $c^{11}$ on the vertical slide-rod $c^{10}$ rides up the incline of the track $c^{12}$ and again raises the pawl $c^5$, causing it to turn the ratchet-wheel and its attached indicating-wheel to the right, Figs. 1 and 5, on the shaft B through a distance represented by the lost motion between the pin $c^2$ and the ears $b^5$, or until the said pin contacts with the right ear $b^5$, such auxiliary movement being sufficient to bring the desired character from its concealed position, Fig. 1$^a$, into exposed position, Fig. 1, back of the view-opening to visually indicate to the purchaser the amount of the purchase.

The operation of turning the pointer to bring the desired character into position adjacent, yet not exposed at the view-opening, I term the "operation of selecting the characters," and I wish to state at this point, that my invention, so far as the concealment of the selected characters and their subsequent exposure by movement of the drawer are concerned, is not limited to the particular selecting mechanism herein shown, for I consider any mechanism wherein certain characters are fixed upon or selected prior to the opening of the drawer and thereafter exposed by movement of the drawer as within the scope of my present invention.

Referring to Figs. 2 and 3, upon the rear end of the pointer-shaft B is mounted and made fast thereto a printing-wheel D, having upon its periphery a series of printing-characters $d$, similar in number and arrangement to the visual characters upon the indicating-wheel, so that when certain of the characters of the latter are selected, as described, the corresponding printing-characters will be simultaneously moved into printing position.

In connection with the printing-characters $d$ I may use any suitable mechanism for making the desired impression therefrom for a permanent record of the successive purchases.

In the particular machine herein shown (see Fig. 4) the printing mechanism consists of a preferably cylindrical rotatable platen $d'$, journaled in the end of the printing-lever $d^2$, pivoted at $d^3$ upon a stud projecting from one of the back frame-plates $b$. This lever $d^2$, as herein shown, has a depending lug $d^4$, which lies against one side of a depending arm $d^5$, loosely journaled upon the said pivot $d^3$ and of such length that its end projects below the top of the inclosing case A into the money or change drawer back of the money-tills therein and in position to be acted upon, as will be described, on movement of the drawer, by a suitable cam $d^6$. (Shown in full lines, Fig. 4, and in dotted lines, Fig. 2.) A spring $d^7$, acting upon the end $d^8$ of the lever $d^2$, acts at the proper time to raise the platen into contact with the characters on the printing-wheel and to maintain the lug $d^4$ in proper contact with the depending gravity-arm $d^5$. When the drawer is opened, the cam $d^6$ acts upon and moves the depending gravity-arm $d^5$ to the right, Fig. 4, said arm acting through the lug $d^4$ to turn the lever $d^2$ on its pivot and drop the platen $d'$ away from the characters upon the printing-wheel to enable the latter to be turned by the pointer into desired printing position. The platen is held in its depressed position until the arm $d^5$ is released by the cam $d^6$, which release takes place during the early part of the opening movement of the drawer, when the spring $d^7$ returns the said lever $d^2$ and arm $d^5$ to their normal positions, thereby bringing the platen against the selected printing-character and making an impression upon the record-sheet, to be described.

The cylindrical and rotatable platen $d'$, as herein shown, is provided with a ratchet $d^8$, coöperating with which is a pawl $d^9$ on the end of the pawl-carrying lever $d^{10}$, loosely journaled on the platen-pivot and provided with a tail, adapted, when the lever $d^2$ is dropped, to contact with a projection $d^{11}$ on the frame, so that at each depression of the platen—i. e., each time it is moved away from the printing-wheel—the contact of the tail of the pawl-carrying lever with the projection $d^{11}$ causes the pawl $d^9$ to rotate the platen through a distance represented by one or more teeth of the ratchet, thus presenting a new surface of the platen at each impression. The lever $d^2$ is also shown as provided with a locking-finger $d^{12}$, which, at each upward or printing movement of the lever $d^2$, passes in front of one of a series of locking-pins $d^{13}$ on the front of the printing-wheel, to thereby restrain the said wheel and the pointer $b'$ from rotation in the direction of the arrow 10, Fig. 4, said wheel, with its shaft and pointer, being restrained from rotation in an opposite direction by the spring-controlled pawl $d^{14}$, Fig. 4, so that the pointer-shaft, with its indicating and printing wheels, can never be rotated in a direction opposite the arrow 10, but can be rotated in the direction of the arrow 10 when the locking-lever $d^{12}$ is moved by depression of the platen.

A printing-strip $s$ is carried upon a suitable reel $s'$ and is passed between the platen and printing-wheel and over a suitable feed-roller $s^2$ to and upon the take-up $s^3$ geared thereto, (see Fig. 4,) said feed-roller $s^2$ being provided with a ratchet $s^4$, coöperating with which is a pawl $s^5$ on an arm $s^6$, adapted to be moved by the projecting end $d^8$ of the lever $d^2$ at each movement of the latter to feed the strip a distance represented by one or more teeth on the ratchet $s^4$ at each printing movement. A type-ribbon $t$ is carried by suitable spools $t'$, one of which is geared to and rotated by the feed-roller $s^2$, the ribbon being fed along by positive rotation of the spool $t'$ by the said feed-roller. This printing mechanism is in general substantially that shown in my former United States patent, No. 467,592, dated January 26, 1892, differing therefrom in minor details only.

Having now described the mechanism for visually indicating to the purchaser the amount of purchase and for permanently recording upon paper the successive purchases, I will now describe the mechanism for adding or summing up the aggregate amount of the purchases, said mechanism being hereinafter designated as the "adding mechanism."

Referring to Figs. 2, 3, 3ª, and 5, I have in the machine shown erected upon the inclosing case A an auxiliary frame consisting of two frame-plates F F, between which, at or near the tops thereof, is held a fixed shaft $f$, upon which are loosely journaled a series, herein shown as four in number, of adding-wheels $f'$, $f^2$, $f^3$, and $f^4$, upon the peripheries of which are displayed, in series, figure-characters ranging, preferably, from "0" to "9" and representing dollars. Each of these adding-wheels is provided with an attached ratchet-wheel $f^5$, having a number of teeth equaling the number of peripheral characters, the number of teeth being herein shown as ten, one of the notches in each of the wheels, except that of the wheel $f^4$, being made deeper than the others, the deep notches $f^6$ registering and being themselves graduated—i. e., the notch in the ratchet of the wheel $f'$ is deeper than that in the ratchet of the wheel $f^2$, that in turn being deeper than the notch in the ratchet of the wheel $f^3$. Coöperating with the ratchet-wheels $f^5$ is a single pawl $f^7$, (see Figs. 2 and 5 and 7 to 10,) having four fingers adapted to engage the four ratchets, the depending ends of the four fingers being of different lengths corresponding to the different depths of the notches $f^6$ in the ratchet-wheels, the said pawl $f^7$ being pivoted at $f^8$ on the ends of the arms $f^9$, pivoted at $f^{10}$ to one of the frame-plates F, one of said arms having a depending tail portion $f^{11}$, to which is connected a spring $f^{12}$ to retain the pawl $f^7$ normally in its elevated position. Reciprocation of the pawl $f^7$ causes step-by-step rotation of the ratchet-wheel $f^5$ of the adding-wheel $f'$ through nine steps until its pawl reaches the deep notch $f^6$ therein, when the next step permits its pawl to drop into the said notch, and thereby bring the end of the next arm of the pawl into engagement with the ratchet $f^5$ of the second wheel $f^2$ to rotate the latter one tooth, and so on throughout the entire series, each complete rotation of one wheel causing a rotative movement of one step of the wheel of the next highest denomination.

I do not claim this particular construction of adding mechanism as a part of my invention, as the same is in substance a well-known construction.

Retrograde movement of the adding-wheels is prevented by suitable spring-controlled pawls $f^{13}$, which engage the several ratchet-wheels.

To each of the adding-wheels $f'$, $f^2$, $f^3$, and $f^4$ I have added a star-wheel $g$, coöperating with which are suitable V-shaped projections $g'$ on the arms or levers $f^9$, which, whenever the said levers are raised to cause a forward movement of one or more of the adding-wheels, enter between two of the V-shaped projections on their respective star-wheels to prevent excessive movement of the adding-wheels. Were it not for this the momentum acquired during the step-by-step rotation of the wheels might be sufficient at times to cause said wheels to move two or more steps, the projections $g'$, however, acting, in connection with the star-wheels referred to, to limit any rotative movement of the adding-wheels to a distance represented by one of the notches of the ratchet-wheels.

Figure 7:
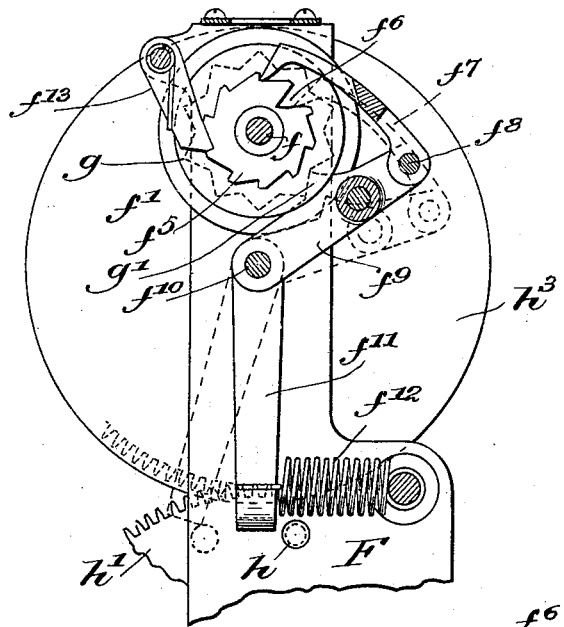
Figure 8:
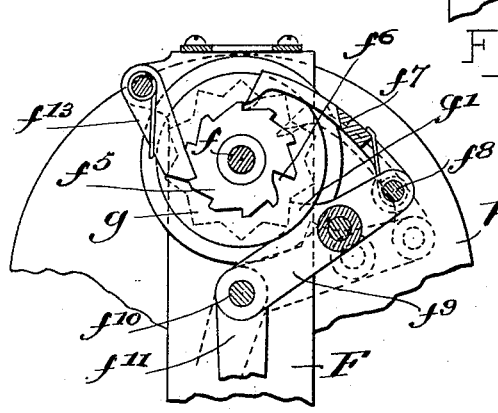
Figure 9:
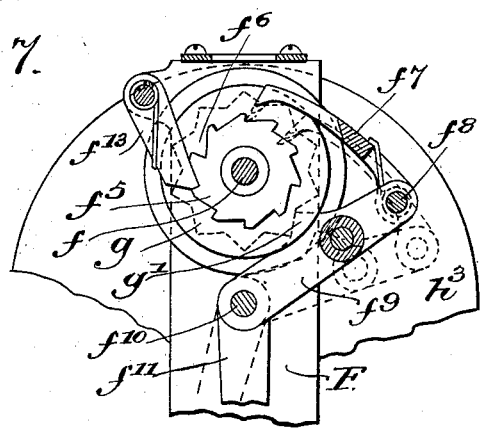
Figure 10:
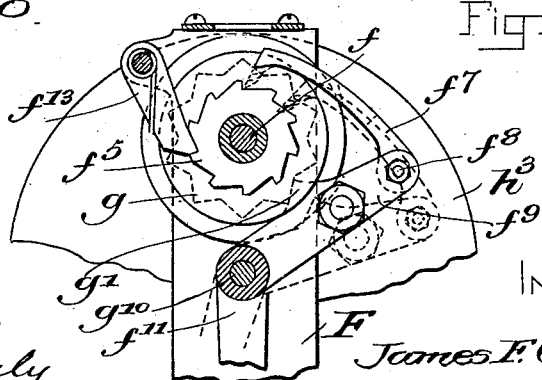

Figs. 7, 8, 9, and 10 represent the engagement of the arms of the pawl with the successive wheels of the series during rotation of the adding mechanism. In Fig. 7 the next forward movement of the pawl will cause one of its arms to drop into the deep notch $f^6$ of the ratchet-wheel $f^5$ of the first adding-wheel, thereby bringing the second arm of the pawl into engagement with the teeth of the second adding-wheel, as shown in Fig. 8, to rotate the latter one tooth, one complete rotation of the second wheel permitting the second arm to drop into the notch $f^6$ therein to enable the third arm to engage the teeth of the third wheel, the latter, in turn, at the end of one complete rotation dropping into a notch in the fourth wheel, which latter has no deep notch, there being no wheel of higher denomination.

The pawl-carrying lever $f^{11}$ is moved to impart a step-by-step movement to the adding-wheels referred to by means of pins $h$ (shown as five in number) upon the side of a toothed wheel $h'$, loosely journaled on the end of a fixed shaft $h^2$, mounted in the frame-plates F, said wheel $h'$ being geared to a second wheel $h^3$, (shown as of the same diameter,) and upon the periphery of which are displayed as many series of characters corresponding to the characters on the indicating and printing wheels and the fixed dial as there are pins $h$ on the wheel $h'$, (herein shown as five in number,) the said characters on the second wheel $h^3$ in the present instance representing cents in multiples of five—i. e., amounts less than one dollar—while the characters on the adding-wheels $f'$, $f^2$, $f^3$, and $f^4$, referred to, indicate the aggregate number of dollars.

It is stated above that the series of characters on the wheel $h^3$ are similar to those on the indicating wheel and dial. This is true with one exception—viz., the twentieth character on the wheel $h^3$ instead of being "1.00," as on the indicating wheel and dial, is "00," the "1" for the dollar being displayed by the first wheel of the adding device adjacent to it.

The wheels $h'$ and $h^3$ are rotated to bring the characters corresponding to the selected characters on the indicating-wheel into proper position by means of an L-shaped pawl $h^4$, (see Fig. 6,) pivoted at $h^5$ to the arm $h^6$ fast on the end of the shaft $h^2$ on which the wheel $h'$ is loosely journaled, the said shaft being surrounded by a coiled spring $h^7$, (see Fig. 5,) which acts to throw the said arm to the right, Fig. 6, in the direction of arrow 25 to draw the pawl $h^4$ in the same direction back over the teeth of the wheel $h'$ without contact therewith.

The depending end of the L-shaped pawl $h^4$ is provided with a roller $h^8$ adapted to be engaged by a striker-plate $h^9$ on the drawer, (see Figs. 3 and 6,) said striker-plate, as shown, having a gradually-inclined portion at its front end, to be referred to. The shaft $h^2$ also has fast upon its end an arm $h^{10}$, (see Fig. 3ª,) which, by the action of the spring $h^7$ referred to, is maintained always in firm contact with a projecting pin $h^{11}$ on a vertical slide-rod $h^{12}$ mounted to slide in suitable bearings on the inside of the front frame-plate $b$, (see Fig. 3,) which slide-bar, as herein shown, has a projecting ear $h^{13}$, (see Fig. 3,) acted upon by a spring $h^{14}$ surrounding a fixed spindle $h^{15}$, which spring acts to normally raise the said slide-bar and maintain it in constant contact with a snail-like cam H fast on the pointer-shaft. The spring $h^{14}$ tending to raise the slide-bar and keep it in contact with the bar being stronger than the spring $h^7$ surrounding the shaft $h^2$ on which the arms $h^6$ and $h^{10}$ are mounted, acts to raise the pin $h^{11}$ and through the arm $h^{10}$ rotate the shaft $h^2$ with its pawl-carrying lever and pawl in the direction of the arrow, Fig. 6, whenever the cam H permits the said slide-bar to be raised, and when the said cam depresses the slide-bar against the action of the spring $h^{14}$ the spring $h^7$ causes the shaft $h^2$ to be rotated to permit its arm $h^{10}$ to follow the downward movement of and in contact with the pin $h^{11}$ and cause the pawl-carrying lever and pawl to be moved to the right, Fig. 6, or in the direction of the arrow 30, into or toward the position shown in Fig. 3ª, to move the pawl back into position to engage and subsequently impart feeding movement to the wheel $h'$.

A spring $h^\times$ surrounding the pivot $h^5$ on the pawl $h^4$ acts to maintain the latter normally out of engagement with the teeth of the wheel $h'$, the limit of movement of the said pawl with relation to the said pawl-carrying lever being fixed by a pin $h^{16}$, (see Fig. 6,) which works in a notch $h^{17}$ in the end of the pawl-carrying lever $h^6$.

The snail-like cam H has as many radii as there are characters on the indicating and printing wheels, the successive radii being uniformly longer than the radii preceding them, as shown in dotted lines Fig. 5.

Assuming the parts to be in the position shown in the drawings, the operation of the adding mechanism is as follows, viz: When the pointer-shaft B is rotated to select a character, as described, the cam H depresses the slide-bar $h^{12}$, and thereby the pin $h^{11}$, permitting the spring $h^7$ to rotate the shaft $h^2$, with its pawl-carrier, to the right, in the direction of the arrow 30, Fig. 6, a distance corresponding to the distance through which the cam has been turned. When the drawer is subsequently opened, the striker-plate $h^9$ engages the roller $h^8$ in the end of the pawl $h^4$ in its position at the right, and the pawl-spring, being weaker than the spring $h^7$ controlling the pawl-carrier, permits said pawl to be first turned on its pivot $h^5$ into engagement with the teeth of the wheel $h'$, further movement of the drawer and striker-plate pushing the pawl in engagement with the wheel, together with the pawl-carrying lever, before it into its dotted position, Fig. 6, thereby rotating the wheels $h'$ and $h^3$ through a distance determined by the length of the retrograde movement of the pawl-carrying lever by the cam H, such rotation of the wheel $h^3$ bringing into reading position a character thereon corresponding to the character selected by the pointer. In the present instance each tooth represents one character on the face of the wheel $h^3$, and there being twenty characters, movement of the twenty teeth represents movement through one entire series of characters thereon, and causes a movement of the first adding-wheel of one tooth, indicating an amount of sales of one dollar. A spring-controlled pawl $f^{17}$, coöperating with the wheel $h'$, prevents retrograde movement of the said wheel. It is evident that the farther to the right, Fig. 6, the pawl-carrying lever $h^6$ is permitted to move by depression of the slide-bar $h^{12}$ by the cam the longer will be the throw of the pawl and the corresponding movement of the wheel. Movement of the pointer to the first character, or "5," on the dial causes the cam to depress the slide-bar sufficiently only to permit the pawl to move to the right, Fig. 6, through one tooth, to thereby cause a subsequent feeding movement of one tooth when the drawer is opened, whereas a movement of the pointer to the character marked "$1.00" on the dial would cause the cam H to depress its slide-bar sufficient to permit the pawl-carrying lever $h^6$ to move back to the right over twenty teeth, thereby causing a feeding movement of twenty teeth on the wheel $h'$ when the said lever is subsequently acted upon by the opening of the drawer, each tooth in the machine shown representing five cents. A stop-arm $f^{18}$ on the shaft $h^2$, and shown in dotted lines, Fig. 6, coöperates with a stop $f^{19}$ on one of the frame-plates F to limit the backward movement of the pawl-carrying lever $h^6$—i. e., the movement of the said lever to the right in the direction of the arrow 30 thereon. It will be noticed that the striker-plate $h^9$ has a long straight top, over which the roller $h^8$ on the pawl $h^4$ may ride after the said pawl and pawl-carrying lever have been given their full movement to permit full opening of the drawer without danger of breaking any of the parts.

Having now described in detail the operation of the independent parts of my machine, I will proceed in a few words to describe the general operation of the machine.

Assuming the parts to be in the position shown in the drawings, the "5" displayed in the view-opening $c'$ on the dial $b^2$ on the face-plate of the inclosing case indicates, visually, the amount of the last purchase, the drawer being closed. The pointer-shaft B, being locked against rotation by the locking-lever $d^{12}$ and projection $d^{13}$, Fig. 4, cannot be rotated until after the drawer has first been opened and stopped by engagement of the hooked end $a^5$ of the locking-lever with the stop $a^6$, said movement acting through the cam $d^6$ on the depending arm $d^5$ to pull down the printing-lever $d^2$ and remove the locking-finger $d^{12}$ to release the pointer-shaft, and simultaneously therewith the inclined portion of the track $c^{12}$ by movement of the drawer drops the roller $c^{11}$ and the vertical slide-rod $c^{10}$ to permit the spring $c^3$, Fig. 5, to move the indicating-wheel back on the said shaft B into position, with its pin $c^2$ in contact with the left ear $b^5$, as previously described. The operator may now turn the indicating-pointer $b'$ to the right to select a character corresponding to the amount of a new purchase, said character thus selected being moved into position next to the view-opening $c'$, yet still concealed within the inclosing case, as described. The operator having opened the drawer thus far is prevented from again closing it without making his change by engagement of a swinging pawl $p$, Fig. 3, carried at the back of the drawer, with a rack $p'$ on the bottom of the drawer-case, so that it is necessary for the operator to completely open the drawer in order to carry the said pawl beyond the front end of the rack, the pawl in the meantime trailing over the teeth of the rack and preventing the drawer from being pushed in. This full opening of the drawer operates, through the pawl $h^4$ in the manner described, to release the lever $d^2$, Fig. 4, and permit the platen to be thrown by its spring $d^7$ against the printing-wheel to make a permanent record upon the paper sheet and at the same time by its finger $d^{12}$ again lock the pointer-shaft against rotation, and the said drawer immediately thereafter, acting through the striker-plate $h^9$ and pawl $h^4$, rotates the wheels $h'$ and $h^3$ a distance corresponding to the depression of the slide-rod $h^{12}$ by the cam H on the pointer-shaft to operate the adding mechanism described. The operator, having fully opened the drawer, is now compelled to deposit the proper amount of money in the drawer in order that the amount of money therein at the end of the day may correspond with the permanent record of purchases upon the paper strip and the aggregate amount of purchase displayed by the adding device, and after fully opening the drawer he must again close the same before the amount of the purchase for which he has just made change in the drawer can be displayed at the view-opening $c'$ and before he can move the pointer for a new purchase, the character selected by the pointer before the drawer was opened and representing the amount of the purchase being now exposed at the view-opening by the roller $c^{11}$ riding up the incline of the track $c^{12}$ and raising the slide-rod $c^{10}$ to cause the pawl $c^5$ to move the indicating-wheel on and with relation to the pointer-shaft through a distance represented by the lost motion between the pin $c^2$ and the ears $b^5$, which is sufficient to move the selected and concealed character into exposed position, as shown in Fig. 1, back of the view opening. During the closing of the drawer the swinging pawl $p$ drags over the rack $p'$, but now in an opposite direction, and while permitting the drawer to be closed the same pawl acts to prevent the drawer being opened until it has been pushed in or closed sufficiently to pass the pawl beyond the inner end of the rack, as shown in Fig. 3. It will thus be seen that a single pawl $p$, by dragging first in one and then in the other direction over a single rack $p'$, prevents, in the one instance, closing of the drawer until it has been fully opened, and in the latter instance opening the drawer until it has been fully closed, thus effecting, in a much simpler form, what has hitherto been accomplished by the use of double racks and pawls.

The plate or shield $a^7$, Fig. 3, prevents the operator depressing the locking-lever $a^2$ for the initial opening of the drawer and thereby raising its hooked end, so as to permit the drawer to be drawn straight out instead of being stopped at the proper point by the stop $h^6$, as it must be to permit the selection of the proper character.

The inclosing case, within which the indicating-wheel rotates, constitutes one form of screen, back of which the selected characters are concealed until exposure of the same is effected by opening of the drawer.

While I have embodied my invention, with its various features, in a machine such as herein shown, because such machine is simple in construction and operation and inexpensive, a single dial, pointer and printing-wheel representing the entire range of the machine, yet my invention, as claimed, is not restricted to this particular construction or type of machine, for my said invention may be used in connection with any type or construction of machine for which it is adapted.

While I have herein shown a movable drawer and a fixed casing and have referred to the drawer in the claims, yet it is evident that a fixed receptacle with a movable cover is an equivalent to the drawer and clearly within the scope of this invention.

Having described one embodiment of my invention, and without limiting myself as to details, what I claim, and desire to secure by Letters Patent, is—

1. A machine of the class described, containing the following instrumentalities, viz: a series of visual indicating-characters, means for carrying the same; a screen; a drawer; manually-operated selecting mechanism for selecting the characters and leaving the same concealed by said screen; locking mechanism for locking said selecting mechanism against movement while the drawer is closed; means operated by partial opening movement of the drawer to release said locking mechanism to thereafter permit movement of said selecting mechanism; and means operated by subsequent movement of said drawer to expose the selected visual character, substantially as described.

2. A machine of the class described, containing the following instrumentalities, viz: a series of visual indicating-characters; means for carrying the same; a screen; a drawer; manually-operated selecting mechanism for selecting the characters and leaving the same concealed by said screen to be subsequently exposed by movement of the drawer; locking mechanism for locking the said selecting mechanism against movement while the drawer is closed; means operated by partial opening movement of the drawer to release said locking mechanism to thereafter permit movement of said selecting mechanism; means operated by subsequent movement of said drawer to lock said selecting mechanism against further movement until the drawer has been closed and again partially opened, substantially as described.

3. A machine of the class described, containing the following instrumentalities, viz: a rotatable indicating-wheel carrying a series of visual indicating-characters; a screen provided with a view-opening; manually-operated selecting mechanism to rotate said indicating-wheel into position with the selected character adjacent to said view-opening yet concealed behind said screen; a drawer and means operated thereby to further move said indicating-wheel to expose the concealed selected character at said view-opening, substantially as described.

4. A machine of the class described, containing the following instrumentalities, viz: a fixed dial; a shaft, and a pointer thereon adapted to sweep the said dial; a screen having a view-opening; an indicating-wheel loosely mounted on the said shaft at the back of said screen; connections between the said indicating-wheel and its shaft, whereby the former is moved into position with the selected character adjacent said view-opening yet concealed behind said screen; a drawer, and means set in operation by movement of the same to further move said indicating-wheel to expose the selected character at the said view-opening, substantially as described.

5. A machine of the class described, containing the following instrumentalities, viz: a dial; a shaft, a pointer thereon adapted to sweep the said dial; a screen having a view-opening; an indicating-wheel loosely mounted on said shaft; connections between the said shaft and wheel to permit a lost motion between one and the other, sufficient to enable the said wheel to move a character from concealed into exposed position; a ratchet on the said indicating-wheel; a pawl; and a drawer, and means operated by movement of the latter to reciprocate said pawl to cause exposure of the selected characters, substantially as described.

6. A machine of the class described, containing the following instrumentalities, viz: a shaft; an indicating-wheel mounted thereon; a printing-wheel also mounted upon said shaft and adapted to be rotated thereby simultaneously with said indicating-wheel; a selecting device to rotate said shaft to select desired indicating-characters and leave the same in concealed position; a drawer and means operated thereby to further rotate said indicating-wheel to expose the selected indicating-character and printing mechanism operated by movement of the drawer and coöperating with said printing-wheel, substantially as described.

7. A machine of the class described, containing the following instrumentalities, viz: a series of visual indicating-characters; means for carrying the same a screen; a drawer; a series of printing-characters corresponding in value to the indicating-characters; manually-operated selecting mechanism for selecting the indicating-characters and leaving the same concealed behind said screen and for simultaneously selecting and moving the printing-characters into printing position; printing mechanism operated by opening of the drawer; and means operated by subsequent movement of the drawer to expose the selected indicating-character, said instrumentalities being combined substantially as described.

8. In an apparatus of the class described, a drawer; a total-adding device and its operating-arm adapted to be moved by said drawer; a rotatable selecting-pointer and a stop moved into different positions thereby to limit or determine the subsequent movement of said operating-arm and its adding device by said drawer, substantially as described.

9. An apparatus of the class described, containing the following instrumentalities, viz: a series of visual indicating-characters; means for carrying the same a screen; a drawer; a total-adding device; manually-operated selecting mechanism for selecting the indicating-characters and leaving the same concealed behind said screen; and simultaneously limiting or determining the subsequent movement of the said adding device; means operated by movement of the drawer to operate said total-adding device and subsequently to expose the selected indicating-character whereby the amount of sale is first included in the total amount of sales and afterward exhibited by the exposed indicating-character, substantially as described.

10. In an apparatus of the class described, a drawer; an adding device operated by movement of the same; a selecting rotatable pointer to fix the movement of said adding device; and locking mechanism for said selecting-pointer, released by movement of said drawer, substantially as described.

11. An apparatus of the class described, containing the following instrumentalities, viz: a drawer; an adding device operated by movement of the same; a series of visual indicating-characters; means for carrying the same; a selecting device to fix the movement of said adding device, and to select said indicating-characters and leave the selected character in concealed position; and locking mechanism for said selecting device; means operated by partial opening of the drawer to release said locking mechanism and to compel full movement of said drawer thereafter, whereby the amount selected is first added, to thereby compel making of change from said drawer; and means operated by final movement of the drawer to expose the said selected and concealed indicating-character to exhibit the amount added, substantially as described.

12. An apparatus of the class described, containing the following instrumentalities, viz: a drawer; an adding device operated by movement of the same; a series of visual indicating-characters; means for carrying the same; a selecting device to fix the movement of said adding device and to select said indicating-characters and leave the selected characters in concealed position; locking mechanism for said selecting device, released by partial opening of said drawer; means to compel full opening of said drawer; means operated by the remainder of the drawer movement to expose the selected indicating-character; and locking mechanism to again lock said selecting device throughout the said remainder of the drawer movement, substantially as described.

13. An apparatus of the class described, containing the following instrumentalities, viz: a drawer; an adding device, an operating member therefor moved by said drawer; a screen; a series of indicating-characters; manually-operated means for selecting the characters and leaving the same concealed by said screen, to be subsequently exposed by movement of said drawer; locking mechanism for locking said selecting mechanism against movement while the drawer is closed; means operated by partial opening of the drawer to release said locking mechanism; and a cam moved by said selecting mechanism to determine the range of subsequent movement of said operating member by said drawer, substantially as described.

14. An apparatus of the class described, containing the following instrumentalities, viz: a drawer; an adding device, an operating member therefor moved by said drawer; a series of indicating-characters, and means for carrying the same; a screen; a fixed dial; a shaft; a selecting-pointer thereon for selecting the said indicating-characters and leaving the same in concealed position, and adapted to sweep the said dial; a cam on the said shaft to determine the subsequent movement of the said operating member and of said adding device by said drawer; locking mechanism for locking the selecting-pointer against movement while the drawer is closed; means operated by partial opening movement of the drawer to release said locking mechanism, substantially as described.

In testimony whereof I have signed my name to this specification in the presence of two subscribing witnesses.

JAMES F. GOODRIDGE.

Witnesses:
FREDERICK L. EMERY,
LAURA T. MANIX.